W. A. SWEET.
Vehicle-Spring.

No. 215,304.  Patented May 13, 1879.

WITNESSES.
H L Perrine
James L. Norris

William A. Sweet
By Boyd Eliot
atty for

INVENTOR.

UNITED STATES PATENT OFFICE.

WILLIAM A. SWEET, OF SYRACUSE, NEW YORK.

IMPROVEMENT IN VEHICLE-SPRINGS.

Specification forming part of Letters Patent No. 215,304, dated May 13, 1879; application filed March 20, 1879.

*To all whom it may concern:*

Be it known that I, WILLIAM A. SWEET, of Syracuse, county of Onondaga, State of New York, have invented a new and useful Improvement in Elliptic Springs, which improvement is fully set forth in the following specification and accompanying drawings, in which—

Figure 1:
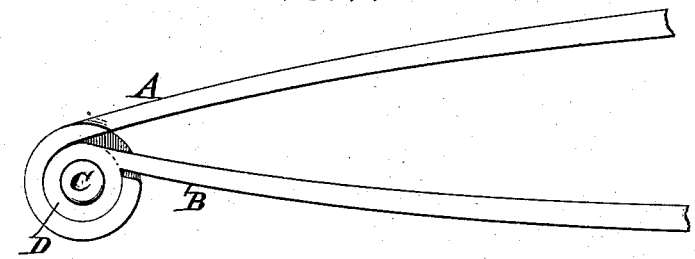
Figure 2:
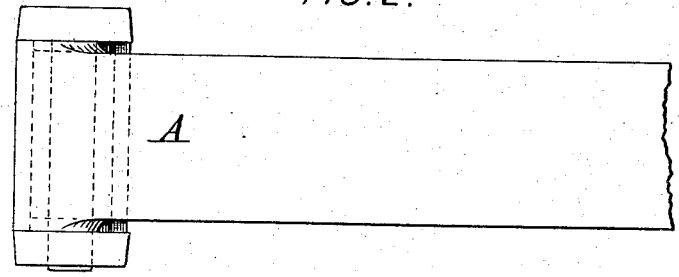
Figure 3:
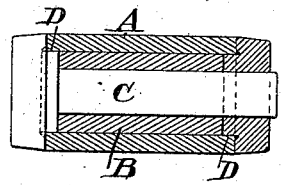

Figure 1 is an end view of the joint, showing a portion of an upper and lower leaf. Fig. 2 is a plan of the same, as seen from above; and Fig. 3 is a section through the joint and through one of the washers.

This invention pertains to certain improvements for which Letters Patent were granted to me November 30, 1869; and the invention consists in forming the ends of the upper or outer leaf a little wider than the lower or inner one, to form a circular recess at each end of the joint, into which a circular rib on the washer may extend, for the purpose of holding it in a firm position to fit the exterior portion of the ends independently of any lateral play of the rivet.

At A and B are shown parts of the two leaves, curved as represented in my former patent; but the end of the leaf A, or the outer one, at the joint, is made wider than the corresponding portion of the inner leaf, as at B; and when the two leaves are fitted together to form the joint, a recess or space is left between the rivet C and the inner face of the center leaf, and into this space a rib cast or swaged on the washer on the under side of the head of the rivet, as at D, (as the case may be,) extends, and when made to fill the space will serve to hold the washers on the heads of the rivets from moving edgewise, whether the shank of the rivet fills the space or not; and hence the edges of the rivets, when finished to fit the exterior of the leaf or joint, will thereby be prevented from breaking said joint or destroying the finished appearance of the spring, as I have found is often the case when the rivets do not fill the hole in the joint, or when the parts between the two leaves become worn.

In practice the ends of the leaves are formed or finished by dies, so that they fit within each other closely.

I claim—

The combination, in an elliptic spring, of the leaves A and B, the leaf A at its joint being made wider than the corresponding portion of the leaf B, whereby a recess or space is formed for a washer on the rivet by which the leaves are held together, substantially as specified.

WM. A. SWEET.

Attest:
　BOYD ELIOT,
　JAMES L. NORRIS.